(12) United States Patent
Taylor

(10) Patent No.: US 9,055,216 B1
(45) Date of Patent: Jun. 9, 2015

(54) USING SENSOR DATA TO ENHANCE IMAGE DATA

(71) Applicant: A9.com, Inc., Palo Alto, CA (US)

(72) Inventor: Colin Jon Taylor, Orinda, CA (US)

(73) Assignee: A9.com, Inc., Palo Alto, CA (US)

( * ) Notice: Subject to any disclaimer, the term of this patent is extended or adjusted under 35 U.S.C. 154(b) by 229 days.

(21) Appl. No.: 13/681,034

(22) Filed: Nov. 19, 2012

(51) Int. Cl.
*H04N 5/232* (2006.01)

(52) U.S. Cl.
CPC .................. *H04N 5/23222* (2013.01)

(58) Field of Classification Search
CPC .................................... H04N 5/23238
USPC ...................................... 348/222.1
See application file for complete search history.

(56) References Cited

U.S. PATENT DOCUMENTS

| | | | | |
|---|---|---|---|---|
| 7,015,954 | B1 * | 3/2006 | Foote et al. | 348/218.1 |
| 8,446,509 | B2 * | 5/2013 | Jones et al. | 348/333.03 |
| 8,791,984 | B2 * | 7/2014 | Jones et al. | 348/36 |
| 2004/0264919 | A1 * | 12/2004 | Taylor et al. | 386/46 |
| 2009/0309987 | A1 * | 12/2009 | Kimura et al. | 348/218.1 |
| 2010/0097442 | A1 * | 4/2010 | Lablans | 348/36 |
| 2012/0287222 | A1 * | 11/2012 | Liu et al. | 348/14.07 |

OTHER PUBLICATIONS

Agarwala, et al. 2005. "Panoramic Video Textures," Computer Science Department Faculty Publication Series. Paper 29. http://scholarworks.umass.edu/cs_faculty_pubs/29.
Szeliski, Richard 2006. "Image Alignment and Stitching: A Tutorial," Foundations and Trends in Computer Graphics and Vision vol. 2, No. 1 (2006) 1-104.
Eyjolfsdottir, et al. 2011. "Multisensory Embedded Pose Estimation," Applications of Computer Vision (WACV), 2011 IEEE Workshop, pp. 23-30.
Szeliski, Richard, "Computer Vision: Algorithms and Applications", 2010; pp. 1-979.

* cited by examiner

*Primary Examiner* — Gary C Vieaux
(74) *Attorney, Agent, or Firm* — Hogan Lovells US LLP

(57) ABSTRACT

Image data and position and orientation data collected by a computing device can be aggregated to create enhanced videos. One example of an enhanced video is a panoramic video generated from a single video camera having a standard field of view. Enhanced videos can also be created to have a display resolution that is greater than is capable of being recorded by at least one video camera of the computing device providing input to the computing device. Enhanced videos can also be streamed live to a viewer, and the viewer can change the perspective of the streamed video or auto-center and auto-focus on a specified location or object in the streamed video.

26 Claims, 7 Drawing Sheets

USING SENSOR DATA TO ENHANCE IMAGE DATA

BACKGROUND

As personal electronic devices become increasingly sophisticated, people are using such devices in new and interesting ways. For example, users can employ their portable computing devices to share personal experiences or interact with others. In particular, users may operate a camera of an electronic device to capture a photograph or video to send to friends or family at a later time, or to stream a video conference with colleagues in real time. Users can also upload photos or videos to social networking sites or photo/video sharing services enabling others to access the user videos. Some users, however, may wish to share certain events in a more immersive, interactive manner than is currently possible with conventional computing devices and methods.

BRIEF DESCRIPTION OF THE DRAWINGS

Various embodiments in accordance with the present disclosure will be described with reference to the drawings, in which.

DETAILED DESCRIPTION

Figure 1A:
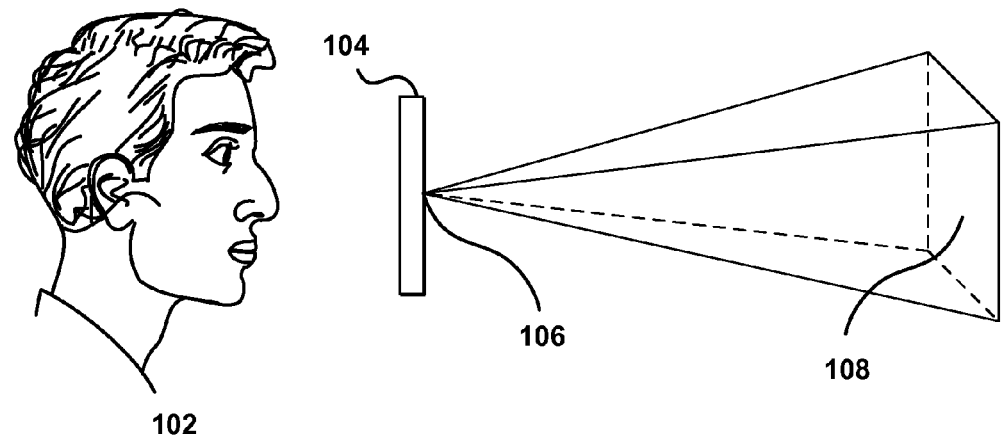
FIGS. 1(a) and (b) illustrate an example of a user creating an enhanced video using a device with an image capturing component in accordance with an embodiment.

Systems and methods in accordance with various embodiments of the present disclosure may overcome one or more of the aforementioned and other deficiencies experienced in conventional approaches to creating and/or editing image data. For instance, users may desire to obtain images and videos representing a wider field of view, e.g., a panoramic image or video, as such content can deliver a more engaging experience for viewers but the users' devices may only be equipped with conventional image capturing components. In some cases, users may desire to provide live streaming video that is more interactive by enabling a viewer to zoom, pan, or tilt to locations in the streamed video of particular interest to the viewer. Various embodiments may be able to achieve such results by utilizing one or more image capturing components and one or more motion or orientation determination components of a device to enable users to generate fuller, richer image data to present to viewers. By associating image data with the pose of the device when the image data was acquired, the image and pose data can be aggregated or otherwise processed to produce enhanced image data according to various embodiments.

In one embodiment, a device featuring a single image capturing component having a standard field of view can be used to generate an enhanced video, representing a wider field of view, without lowering display resolution. A significant portion of such an enhanced video may be displayed live such that the enhanced video can be streamed using a wireless networking component of the device. In a particular embodiment, some portions of the enhanced video not being captured live can retain certain dynamic qualities.

In another embodiment, a device featuring an image capturing component that will be referred to herein as "front-facing" and another image capturing component that will be referred to as "rear-facing" can be used to create an enhanced video. It should be understood, however, that various surfaces or components can be used in various embodiments, and terms such as "front-facing" or "rear-facing" are used for purposes of explanation and do not require a specific orientation unless otherwise stated. Each of the front-facing and rear-facing image capturing components, positioned on opposing sides of a device in at least some embodiments, may have standard fields of view yet the enhanced video generated from such a device may be displayed to represent a wide field of view without display resolution degradation. For example, the enhanced video generated by such a device can display in real time: the user, significant portions of the user's viewing perspective, and significant portions of the user's background. In a certain embodiment, particular portions of the video not capable of being displayed live may nevertheless have a measure of dynamism.

In another embodiment, each of the front and back of a computing device may incorporate a camera with a fish-eye lens or other type of wide-angle lens and a conventional camera. An enhanced video can be generated depicting a horizontal viewing angle up to 360° from such a device. Every portion of the enhanced video may be live, and significant portions of the video can be rendered in high definition or equivalents thereof and other portions of the enhanced video may be rendered according to the display resolution of the camera using the fish-eye or wide-angle lens to generate a foveated video. In another embodiment, the entire enhanced video may be initially presented according to the display resolution of the camera using the fish-eye or wide-angle lens but the user of a computing device and/or a viewer of the enhanced video may select to "zoom" into certain portions of the enhanced video to view the image data captured at high definition. In still other embodiments, a device incorporating multiple image capturing components on multiple surfaces of the device can be used to produce 100% live video corresponding to a horizontal viewing angle up to 360° all at high definition or equivalents thereof.

In various embodiments, the enhanced video can be streamed to a viewer live or otherwise be provided to the viewer at another time by storing the output video on a streaming server, uploading to a data store from which a viewer can download the enhanced video, or other mode of electronic communication (e.g., email). Even when the enhanced video is streamed live, the viewer can select different viewing perspectives. For example, in the embodiments where the user device is coupled with front- and rear-facing cameras, the viewer can select a view comprising only of the user, e.g., the view of the rear-facing camera, or the scene in front of the user, e.g., the view of the front-facing camera. As another example, while the user may be zoomed and/or focused on a particular region of interest, the viewer can concurrently select to zoom out or focus on a different region. In one embodiment, the viewer can select to auto-focus or auto-center on the different region.

In another embodiment, the computing device may be configured to auto-focus and/or auto-center on the user such that at least a portion of an enhanced video generated from such a configuration can remain "fixed" on the user despite changes in the pose of the computing device. This may be advantageous for video conferencing. For example, the user may position and rotate the computing device in different ways to capture image data from the front-facing camera(s), such as for demonstrative purposes, yet the image data from the rear-facing camera(s) will remain fixed on the user. In one embodiment, front-facing cameras can be configured to auto-center and/or auto-focus in a manner corresponding to the rear-facing cameras. This may enable the front-facing cameras to capture image data that is "fixed" with respect to the user's viewing perspective similar to the manner in which the rear-facing camera(s) capture image data that is "fixed" with respect to the user. In another embodiment, the front-facing camera(s) may function in a conventional manner and capture image or video data comprising the field of view of the front-facing camera(s).

Various other applications, processes and uses are presented below with respect to the various embodiments.

As discussed, there can be several configurations for a computing device using one or more image capturing components and one or more motion and/or orientation determination components to generate an enhanced video. FIG. 1(a) illustrates a user 102 obtaining input video data using an image capturing component 106 of computing device 104 to capture a scene of a location 108. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, notebook computers, personal data assistants, cellular phones, video gaming consoles or controllers, and portable media players, among others. Although not shown, the computing device 104 also includes one or more motion and/or orientation components that capture the motion and/or orientation of the device 104 at an instant in time. This motion and/or orientation data is associated with image data captured simultaneously at the same instant in time the orientation/motion data was retrieved by computing device 104.

Figure 1B:
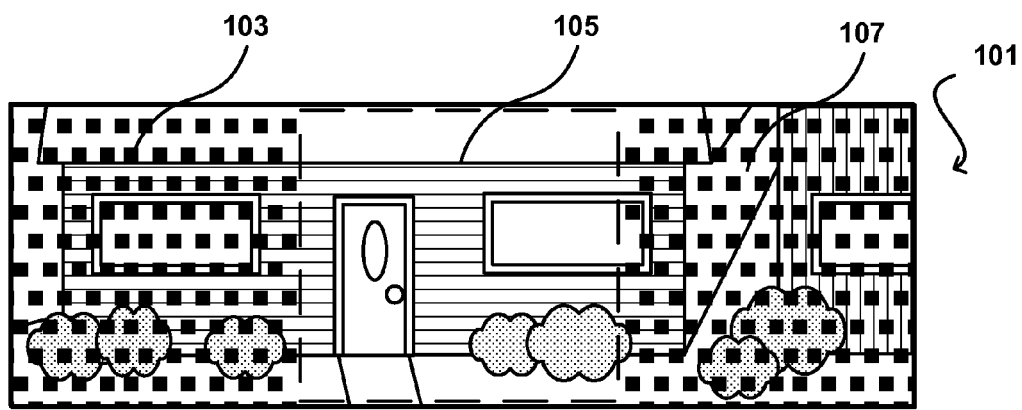

FIG. 1(b) illustrates a state or a single frame 101 of the enhanced video in the same instant in time as in FIG. 1(a). Pixels at the bounded region 105 at the center of FIG. 1(b) may correspond to pixels captured of the scene 108 by the user 102 in FIG. 1(a). In this example, the image capturing component 106 is capable of recording video at a conventional display resolution, e.g., 1920×1080. However, the display resolution for the enhanced video may be much wider, e.g., 5760×1080, depending upon factors such as the path of motion. As a result, only the pixels of the enhanced video being captured live is encompassed by the region 105. In this example, the user, from a single location, has previously panned from left to right and then from right back to the location of scene 108. Pixels in regions 103 and 107 may be "historic" pixels captured during the previous panning by the user 102. The pixels of the frame 101 can thus be a composite of "historic" pixels from a time $t_1$ at the region marked 103, "historic" pixels at a time $t_2$ at the region marked 107, and live pixels at a current time $t_3$ at the region 105.

In certain embodiments, the current state or video frame 101 of the enhanced video can be simultaneously displayed to the user 102 at a display component of device 104. The regions 103 and 107, in some embodiments, can be highlighted, grayed out, or displayed with similar visual cues to give notice to the user the portions of the enhanced video that still need to be updated (or captured for the first time if no historic video data exists).

In one embodiment, segments of the enhanced video not incorporating live data, such as region 103 and 107 (e.g., because of the limited field of view of the image capturing component), may be "painted" or textured into the frame 101 using certain image motion techniques. For example, image data corresponding to a non-live region, such as regions 103 and 107, may be captured for a period of time to detect image motion (as opposed to motion from the camera, such as jiggering). If no image motion is detected, it can be assumed in this embodiment that the pixels at that non-live region can be represented statically, which may result in conserving memory/data storage resources. If image motion is detected, the type of image motion may be determined. If the image motion is of a repetitive nature, such as grass blowing in the wind or swaying trees, the period of the repetitive behavior or "loop" may be ascertained and video data can be captured to represent the non-live region in accordance with the repetitive, looping behavior. If the image motion is too difficult to model at the non-live region, captured image data for the non-live region can be leveraged to remove dynamic elements using various image processing techniques such as blending or de-ghosting. Such approaches can provide a more pleasing output video.

Figure 2A:
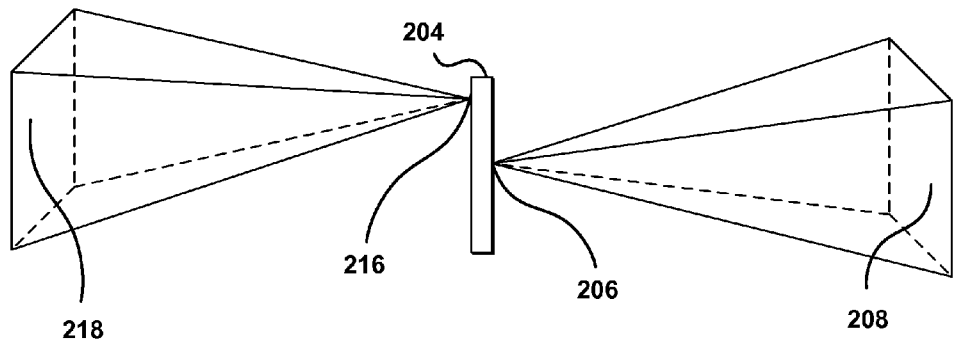
FIGS. 2(a), (b), and (c) illustrate an example of a user creating an enhanced video using a device with a front-facing image capturing component and a rear-facing video capturing component in accordance with an embodiment.
Figures 2B, 2C:
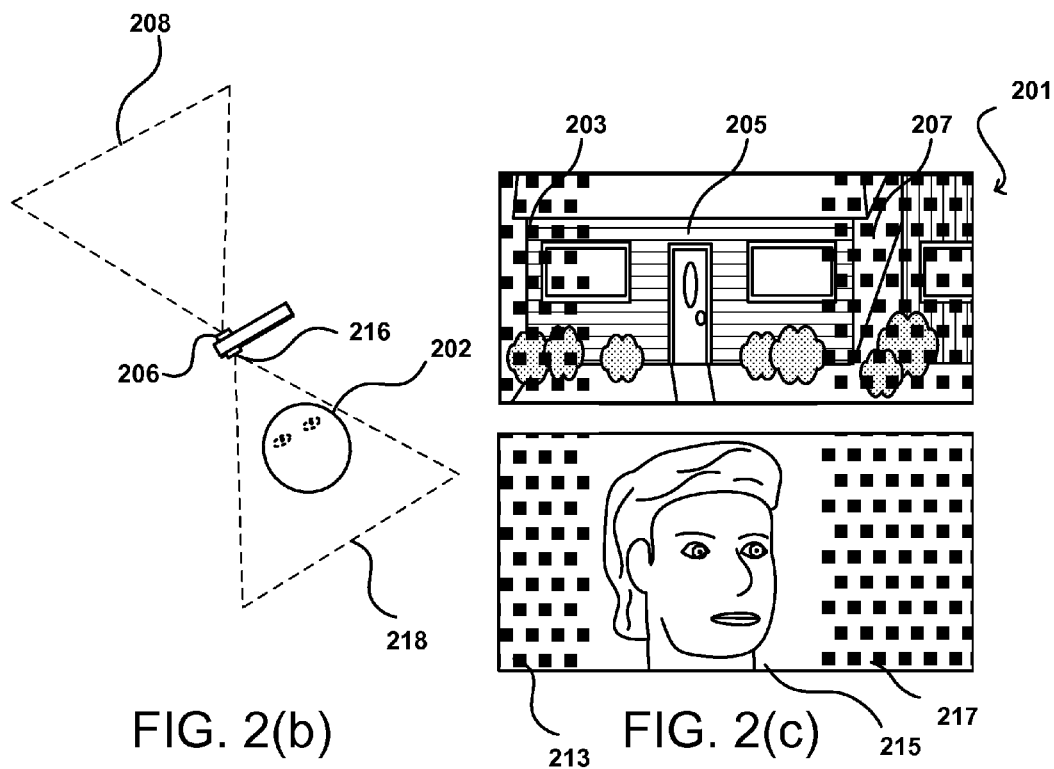

FIGS. 2(a) and (b) illustrate an example of a user 202 employing a computing device 204 incorporating a front-facing image capturing component 206 and a rear-facing image capturing component 216 to capture a scene 208 of the user's viewing perspective and a scene 218 of the user and the user's background in accordance with another embodiment. FIG. 2(a) is a side perspective view of device 204, and FIG. 2(b) is a top-down perspective view of user 202 and device 204. In this example, front-facing image capturing component 206 and rear-facing image capturing component 216 are both capable of recording video at standard display resolutions. Front-facing camera 206 may be capable of recording video at a conventional display resolution, e.g., 1280×720, and rear-facing camera 216 may be capable of recording video at a different conventional display resolution, e.g., 640×480. User 202 is obtaining video data simultaneously from cameras 206 and 216 to capture scenes 208 and 218, respectively. Although not shown, user device 204 can also include one or more motion and/or orientation components that are capable of concurrently determining motion/determination data as scenes 208 and 218 are captured.

FIG. 2(c) illustrates a state 201 of the enhanced video at one instant time using the device 204 of FIGS. 2(a) and (b). In this example, region 205 may correspond to the scene 208 of FIGS. 2(a) and (b), and the region 215 may correspond to the scene 218 of FIGS. 2(a) and (b). The user 202 has previously panned the device 204 left to right, and then from right back to a location corresponding to the scenes 208 and 218. Similar to the example of FIGS. 1(a) and (b), the output video in this example comprises a display resolution that is wider than image capturing components 206 and 216 are capable of recording. While the image data corresponding to regions 205 and 215 are live because the cameras 206 and 216 are pointed at scenes 208 and 218, respectively, the pixels at regions 203, 207, 213, and 217 are not live pixels because the cameras 206 and 216 may not support a wide field of view. The techniques described above with respect to FIGS. 1(a) and (1b) can also be used to reconcile what image data to present at regions 203, 207, 213, and 217.

FIG. 2(c) can also represent a display mode in accordance with various embodiments wherein the enhanced video is "split-screened" as two 180° views of the enhanced video. In another embodiment, a top-down display mode may be available where image data capturing components can capture images 180° vertically. FIG. 2(c) can also be concurrently displayed to a display component of user device 204 as discussed above with respect to FIG. 1(b).

Figure 3A:
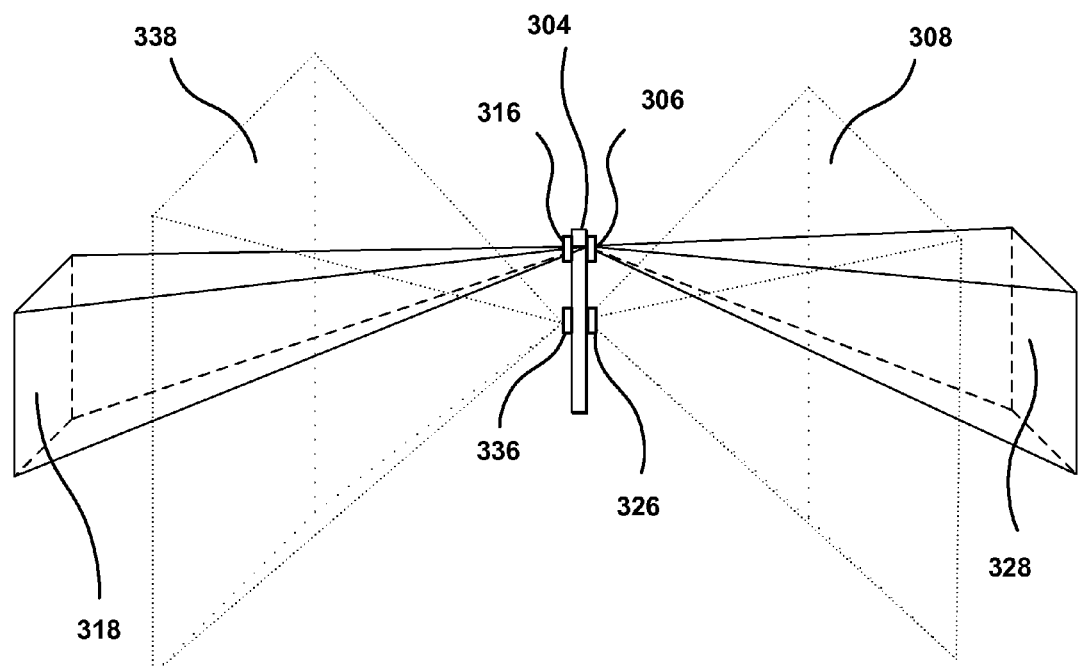
FIGS. 3(a), (b), and (c) illustrate an example of a user creating an enhanced video using multiple video capturing components in accordance with an embodiment.
Figure 3B:
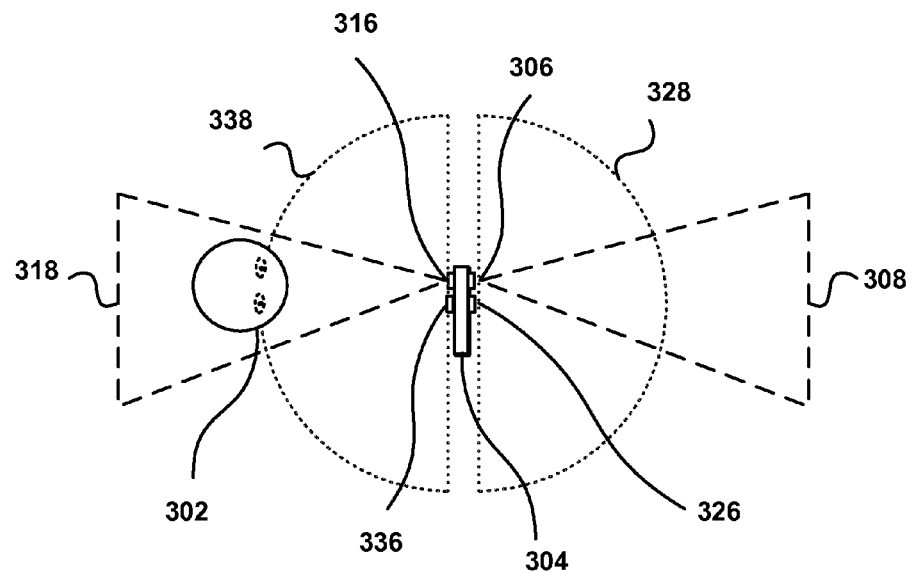

FIGS. 3(a) and (b) illustrate an example of a user 302 utilizing a computing device 304 having multiple front-facing image capturing components 306 and 326 and multiple rear-facing image capturing components 316 and 326 in accordance with an embodiment. FIG. 3(a) depicts a side view of device 304, and FIG. 3(b) is a top-down view of the user 302 and user device 304. Image capturing components 306 and 316 have standard camera lenses, e.g., angle of view between 42° and 60° of view, and are capable of recording video at conventional display resolutions, e.g., 1920×1080. Image capturing components 326 and 336 utilize full-frame fish-eye lenses, e.g., diagonal angle of view of 180°, and are capable of recording video at a display resolution of 1370×240. In other embodiments, wide-angle lenses, e.g., angle of view between 64° and 84°; rectilinear lenses; and circular fish eye lenses, e.g., horizontal and vertical field of view of 180°, can also be used. Each of these types of camera lenses, including full-frame fish-eye lenses, can be referred to generally as wide-angle lenses, and each are within the scope and spirit of the invention.

In this example, user 302 is obtaining input video data from each of the four image capturing components 306, 316, 326, and 336 to capture video at scenes 308, 318, 328, and 338, respectively. Concurrently, user device 304 is retrieving motion/orientation data as video of each scene 308, 318, 328, and 338 is captured. Each segment of the output video is generated in real time, and coverage by each of the image capturing components 306, 316, 326, and 336 is substantially 360° in the horizontal plane.

Figure 3C:
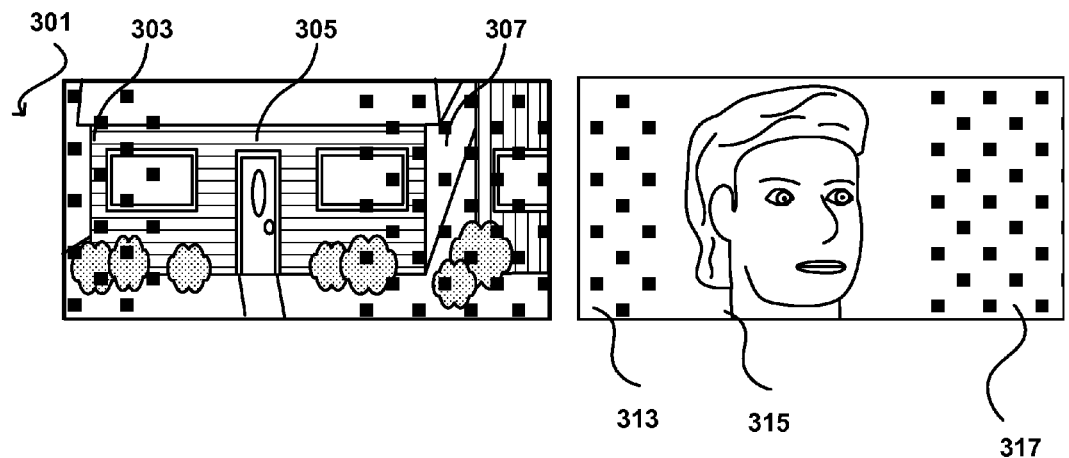

FIG. 3(c) illustrates a state 301 of the enhanced video using the device 304 of FIGS. 3(a) and (b). Regions 303, 305, and 307 may correspond to the user's viewing perspective (i.e., scenes 308 and 328), and regions 313, 315, and 317 may correspond to a perspective of the user 302 (i.e., scenes 318 and 338). Similar to FIG. 1(b) and FIG. 2(c), FIG. 3(c) can also represent the content being displayed to the user at a display component of device 304. Although each of regions 303, 307, 313, and 317 may comprise live pixels, the regions are depicted herein to represent that the source image data corresponding to the regions, i.e., image capturing components 326 and 336, respectively, are capturing video at a lower resolution than image capturing components 306 and 316. Regions 305 and 315, however, are depicted in a different, higher resolution, and the enhanced video can be thought of as comprising foveated image or video data. In other embodiments, the entire enhanced video can initially be presented in the lower resolution, such as the resolution corresponding to regions 303, 307, 313, and 317, but a user and/or viewer may be able to select certain portions of the video to view a higher resolution portion, such as the resolution corresponding to regions 305 and 315.

Figure 4A:
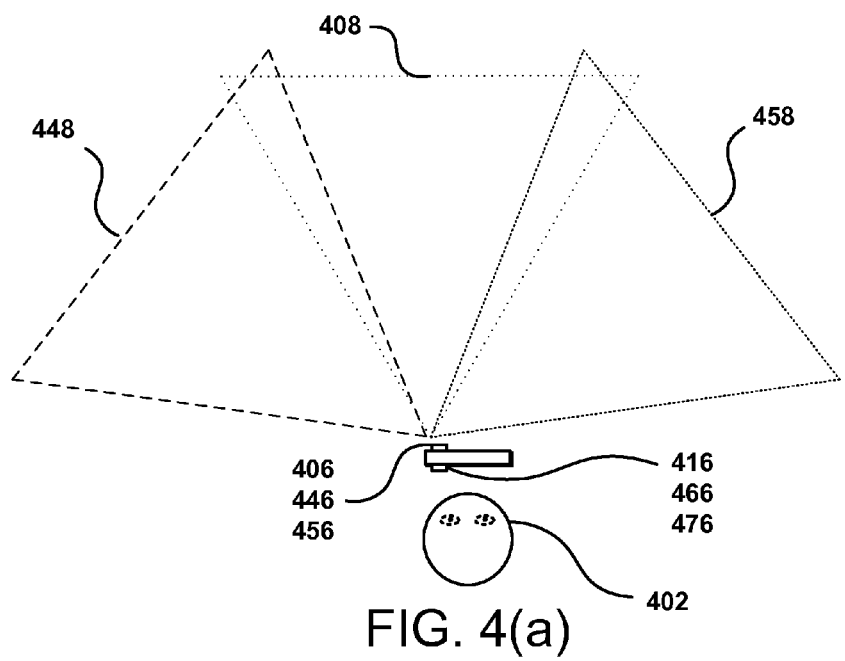
FIGS. 4(a) and (b) illustrate an example of a user creating an enhanced video using multiple video capturing components in accordance with various embodiments.

FIG. 4(a) illustrates an example of a user 402 operating a computing device 404 having a plurality of front-facing video camera 406, 446, and 456, and a plurality of rear-facing image capturing components 416, 466, and 476 in accordance with various embodiments. In this example, each of the image capturing components 406, 416, 426, 446, 456, 466, and 476 are capable of recording video at a convention display resolution, e.g., 1280×720. Although image capturing components 406, 416, 426, 446, 456, 466, and 476 are represented as different elements, it should be understood that each of cameras 406, 446, and 456 and cameras 416, 466, and 476 can be arranged in an array and may be embodied in a single housing. In other embodiments, image capturing components 446, 456, 466, and 476 may be located on the sides or the top and/or bottom of the computing device.

Figure 4B:
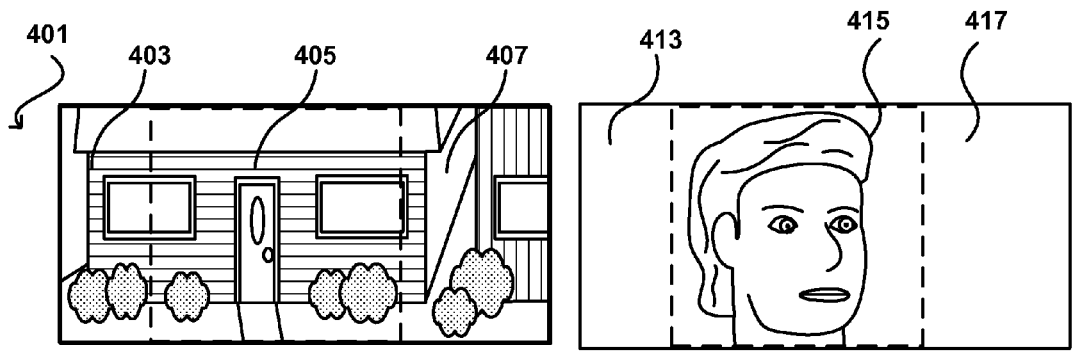

FIG. 4(b) illustrates a state of 401 of the enhanced video using the device 404 of FIG. 4(a). Each of regions 403, 405, 407, 413, 415, and 417 are captured by video cameras 446, 406, 456, 466, 416, and 476, respectively. In this example, each region is captured live at full resolution. At the same moment in time, user device 404 is obtaining and storing motion and/or orientation data to associate with these video frames. As discussed above, FIG. 4(b) can also represent a current state of the output or enhanced video, the content being displayed to the user 402 on a display component of user device 404, or the view of the viewer receiving the enhanced video via stream, file share, downloading, email, etc.

In various embodiments, FIG. 4(b) can also represent a current frame of the enhanced video being streamed to a viewer in accordance with various embodiments. FIG. 4(b) illustrates two planes of the 360° enhanced video panorama as a default display mode, but the viewer may select a different perspective, such as a full 360° mode. Alternatively, the viewer may select a different projection model such as a cylindrical model. In addition, the user may select to focus on a region of the enhanced video different from the focal point of the user. For example, the viewer may select to focus on the user's face or particular facial features, and the video will auto-focus and/or auto-center on the viewer's selected location. Moreover, the viewer can pan, tilt, and zoom to different regions of the video during streaming. In another embodiment, the user may configure the computing device such that the enhanced video auto-focuses and/or auto-centers on the user despite changes in pose of the computing device.

Figure 5:
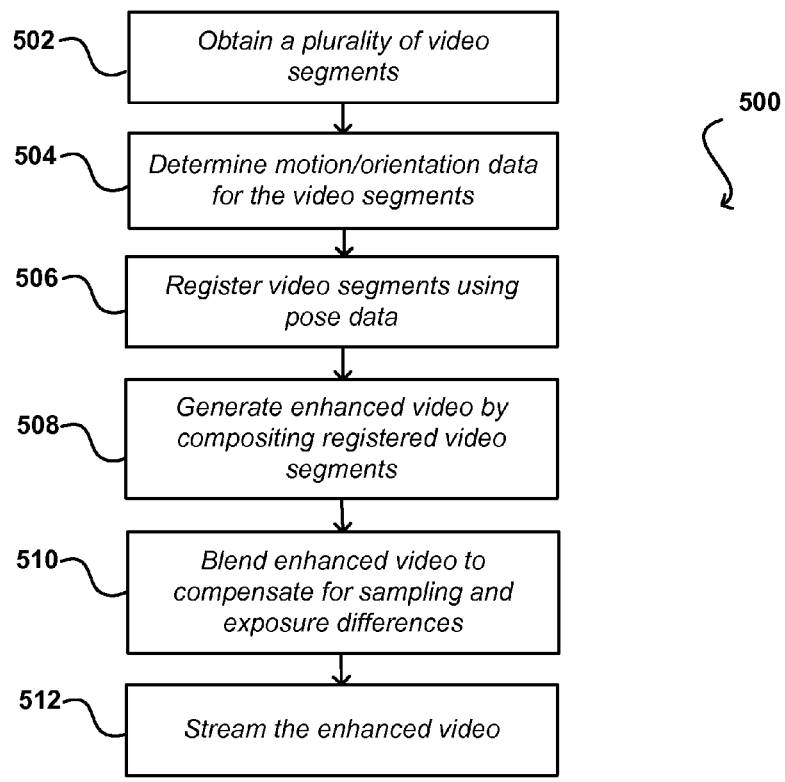
FIG. 5 illustrates an example process creating an enhanced video in accordance with various embodiments

FIG. 5 illustrates an example process 500 for creating an enhanced video that can be used in accordance with various embodiments. It should be understood that, for any process discussed herein, there can be additional, fewer, or alternative steps performed in similar or alternative orders, or in parallel, within the scope of the various embodiments unless otherwise stated. In this example, the process is initiated by the user entering an enhanced video capture mode of the computing device. The enhanced video capture mode can be activated in response to any appropriate action, such as a user opening an application or selecting an option, a user depressing a button on the computing device designated for enhanced video capture mode, performing a gesture or providing other such input, and the like. In other embodiments, enhanced video capture mode might be activated by voice command.

After the enhanced capture mode is initiated, a mapping between the dimensions of the enhanced video and each of the image capturing components can be determined 502. For example, the enhanced video can include parameters indicating a pixel position address, such as (x,y), with respect to a time t. Similarly, each of the image capturing components include parameters, including a three-dimensional position (x, y, z) and a three-angle rotation ($\phi$, $\theta$, $\psi$) with respect to a time t. In addition, the image capturing components may include other characteristics such as focal length and the rotation and/or translation from the motion determination components. Each of these dimension contribute to how pixel addresses of the enhanced video relate to the pixels captured by the image capturing components.

After determining the mapping between pixels of the enhanced video to pixels of the image capturing components, the next step comprises obtaining a plurality of video segments 504. In some embodiments, the camera can be calibrated to capture frames in a manner to reduce computation during subsequent phases such as image transformation or alignment. In other embodiments, some characteristics of the video camera, such as focal length, principal point, skew coefficient, or distortion coefficient are obtained and accounted for in later stages. Preferably, every pixel of the projection model would be obtained at least once during video capturing. In addition, for certain embodiments not capable of generating live panoramas, it would be preferable for dynamic elements in the periphery of the projection model to be repetitive (e.g., grass blowing in the wind or swaying trees) and such peripheral dynamic elements to be captured for a period of time corresponding to the repetitive behavior or "loop" as discussed above. In some embodiments, a user may capture all of the segments of video manually by panning, tilting, and/or zooming the computing device. In other embodiments, the computing device may guide the user in capturing the video segments by providing the user cues. These cues may be a part of a graphical user interface such as text displays, graphical overlays, and/or arrows directing the user how to orient and/or position the camera, and/or the cues may comprise highlighting or other visual indications specifying portions of the output video already captured and portions of the output video not captured. Computer voice commands can also be combined with the visual cues of the graphical user interface. In one embodiment, computer voice commands are used exclusively. In still other embodiments, capturing video is an automatic process that can be achieved by one or more rotatable video cameras controllable by the computing device to pan, tilt, and zoom such cameras.

In various embodiments, a portable computing device will include one or more motion and/or orientation determination components that may comprise a combination of hardware and software elements. Hardware components for determining motion/orientation can include a three-axis accelerometer to measure the acceleration of the device along each of the x-, y-, and z-axes, a three-axis gyroscope to measure the rate of change of the device's orientation along each of the x- (pitch), y- (roll), and z-axes (yaw or azimuth), or a geomagnetic field sensor (also sometimes referred to as a magnetometer or digital compass). Conventional personal electronic devices typically incorporate hardware devices such as accelerometers, gyroscopes, or magnetometers. When combined, these hardware components can provide more accurate measurement of overall movement and location through space by providing constant, cross-referenced measurements of spatial placement and acceleration. Linear velocity and position/angular position can be obtained by integration and double integration, respectively, of the data output by the hardware components over time. As integration may result in imprecision, the data from the gyroscope and accelerometer are preferably merged using a Kalman filter or complementary filter or variations thereof to compensate for errors such as drift by the gyroscope. Implementations for calculating linear velocity, and position/angular position, and for Kalman/complementary filters may be hardware- or software-based. For software implementations, application programming interfaces (APIs) are widely available for a variety of mobile devices incorporating particular orientation and position determination devices.

The motion and orientation determination component is used by various embodiments for determining motion, position, and/or orientation data of the electronic device 506 for each frame of video recorded during the video capturing phase. Where a camera is rigidly attached to the body of the electronic device (and not capable of independent rotation), the camera may be related to the hardware elements of the pose determination component by a constant translation and rotation, and the camera position and orientation can be reconciled accordingly. Where the camera can rotate independently of the body of the electronic device, the translation and rotation of the camera with respect to the hardware elements of the pose determination component can be determined by the computing device. The computing device may be able to precisely control camera pose or may rely on the hardware pose determination components to resolve camera pose. The video cameras and the hardware pose determination components are synchronized such that each captured video frame corresponds with data for the pose of the computing device sensed at the same moment in time.

After video and pose data acquisition, various embodiments process the aggregated data in a step that can be referred to as video registration 508. Video registration leverages terminology and concepts from conventional image registration processes that are well-known to those of ordinary skill in the art. Therefore, some of the problems and known solutions of image registration are equally applicable to video registration. With a defined coordinate system, video registration can be thought of as translating disparate data into a common coordinate system. Although various embodiments assume a defined coordinate system, certain alternative embodiments do not rely on a defined coordinate system at the outset and both variations are within the scope of the invention. In an undefined coordinate system, registration can be thought of as the process of discovering correspondences among images with varying degrees of overlap and attempting to piece together components that best fit to create a coherent model.

Video or image registration techniques can include direct methods or feature-based methods. Direct methods can refer to pixel-to-pixel matching and may operate according to an error metric used as a threshold to compare how well two images correspond. Once the error metric has been defined, an appropriate search approach is determined to find correspondences between images. A brute force search approach can be used to determine such correspondences, but may be computationally expensive. Therefore, hierarchical coarse-to-fine techniques based on image pyramids can be used. Fourier transforms can also be used to speed up computation. Additional steps operating at the sub-pixel level such as those based on expansion of a Taylor series or parametric motion models of the image data can also be used.

Feature-based methods can refer to matching salient features between respective images and may include the steps of extracting suitable features from the respective images, matching such features to establish a global correspondence, estimating the geometric transformation between the respective images, and resampling and transforming the images. Features can be points of interests or key points within an image and may include edges (detected using, e.g., Canny edge detection), corners (detecting, using, e.g., Harris corner detection or Smallest Univalue Segment Assimilating Nucleus (SUSAN) corner detection), or regions of interest (detected, using, e.g., LaPlacian of Gaussian pyramids or Difference of Gaussian pyramids). After detecting the features, feature-based registration methods next involve feature matching techniques, such as the Scale Invariant Feature Transform (SIFT) algorithm or the Speeded up Robust Feature (SURF) algorithm. Once feature correspondences have been computed, a subset of the correspondences can be selected to estimate a transformation that will produce an accurate alignment. Methods used for transformation estimation can include RANdom Sample Consensus (RANSAC) or least median of squares (LMS) methods.

In various embodiments, direct methods may be used to register captured video. In other embodiments, feature-based methods can be used for video registration as both registration approaches are contemplated and equally within the scope of the invention. The motion, position, and/or orientation data obtained for each video frame may be used to significantly reduce the search space and computation for either the direct or feature-based approaches. For example, the pose data for each video frame, which may provide estimates regarding the position and orientation of each frame, can be used to align frames according to a global coordinate system. Geometric transformations, such as translations, rotations, scalar transformations, affine transformation, and homographies, can also be applied to each frame according to the coordinate system based upon the pose data. For instance, if part of a video is captured at arm's length but the user subsequently bends her elbow, an appropriate scalar transformation can be applied to compensate for differences when the camera was positioned at arm's length versus when the camera was positioned at less than arm's length. In another situation, there may be jitter as the user is capturing video but the pose of the camera can be used to correctly align jittered frames to fit within the coordinate system. Direct registration methods or feature-based registration methods can then be used to resolve those areas where frames overlap and there may be issues such as mis-alignment or incorrect transformation. However by leveraging motion, position, and/or orientation data, these issues may be minimized.

Once registration has been completed, the compositing surface or projection model for the enhanced video may be defined. A projection model can be thought of as the canvas upon which pixels of captured video frames are painted. Another way of understanding the projection model is to imagine the entire field of view for all viewing angles for a particular location at a moment in time as the surface of a sphere; then the projection model may refer to a two-dimensional surface to which the entire spherical field of view is translated for purposes of display. A projection may be one of a planar surface (or rectilinear projection), a cylinder, or a sphere (or equirectangular projection). A planar projection may be suitable for videos with lower horizontal view angles but may be less advantageous for videos having horizontal angles of view greater than 120°. For example, exceeding this horizontal viewing angle may result in skewing of objects appearing at the edges of the video frames. A cylindrical projection can be used to capture video up to 360° horizontally but lines parallel to the horizon may be curved. In addition, a cylindrical projection may not be suitable for videos with a very large vertical angle of view where deformations can be perceived at the top and bottom of the video exceeding 55° above or below the field of horizon. A spherical or equirectangular projection may not be limited to any horizontal or vertical viewing angle but may require a special display such as a domed or hemispherical screen and/or customized viewing application. In certain embodiments, such as those associated with at least one front- and rear-facing camera, other projections may include cut planar projections or piece-wise planar projections. Other types of projection models known to be used in photographic panoramas include a Mercator projection, a fisheye projection, a sinusoidal projection, and a stereographic projection, but these projections may be less advantageous for video panoramas.

After defining the projection model, compositing the registered video segments 510 and addressing matters such as sampling and exposure differences may begin. Sampling differences may occur in situations where video segments are captured by image capturing components having different resolutions, such as those the examples described above in FIG. 2(c) and FIG. 3(c). Sampling and exposure differences can be compensated with various blending techniques 512 known to those of ordinary skill in the art, including feathering and center-weighting, Laplacian pyramid blending, gradient domain blending, or high dynamic range imaging.

Figure 6:
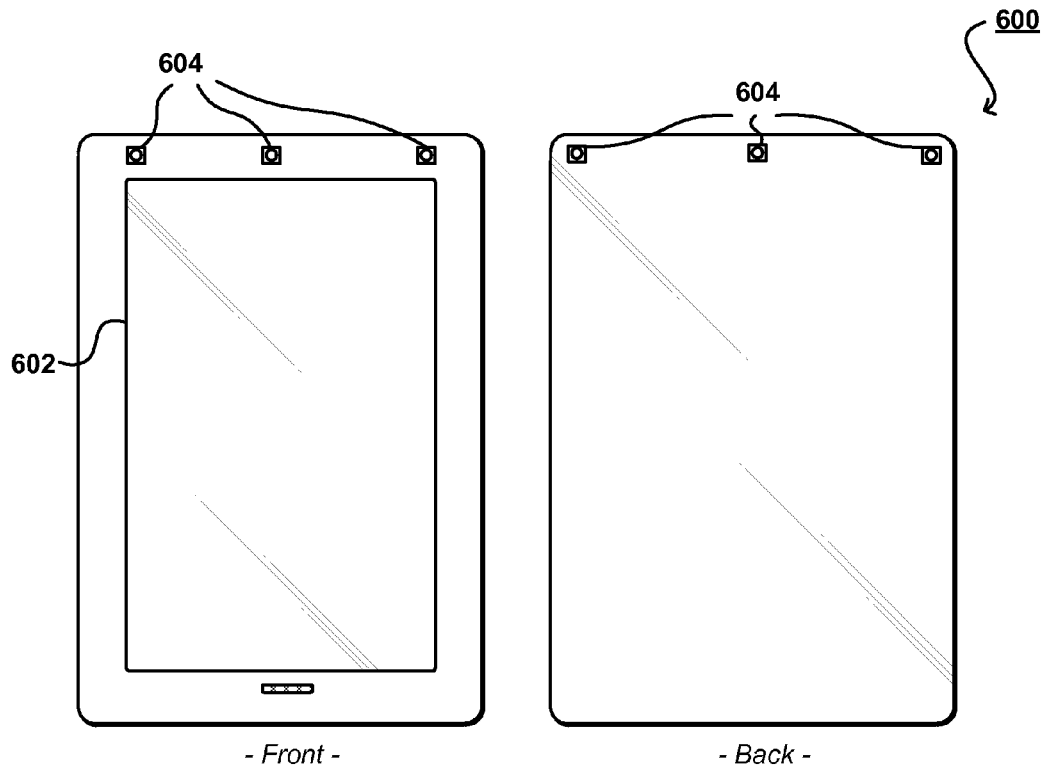
FIG. 6 illustrates an example of a computing device that can be used in accordance with various embodiments.
Figure 7:
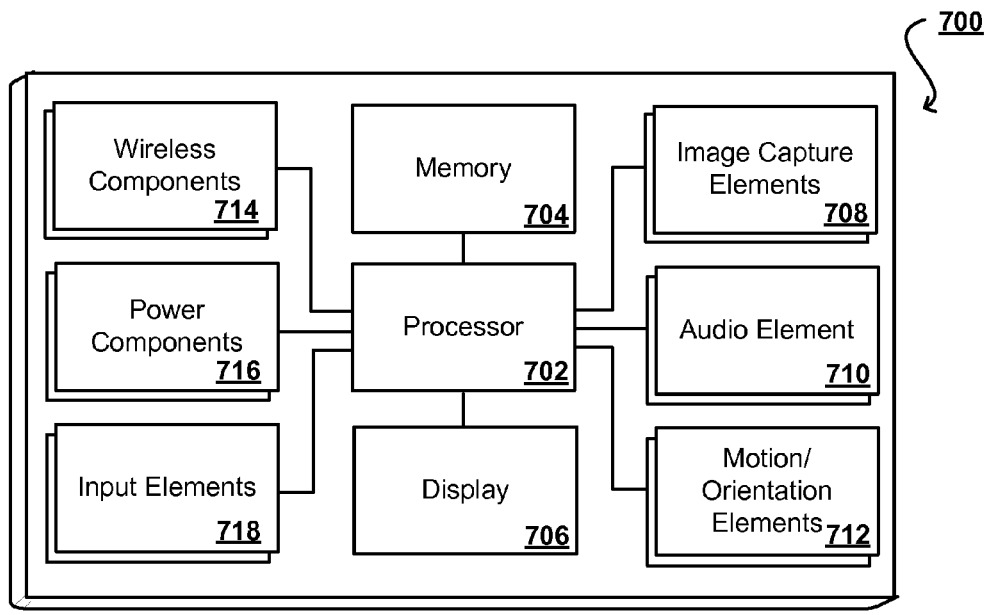
FIG. 7 illustrates an example configuration of components of a computing device such as that illustrated in FIG. 6.

FIG. 6 illustrates an example computing device 600 that can be used to perform approaches described in accordance with various embodiments. In this example, the device has an array of conventional digital video cameras 604 on each of a same and opposite side of the device as a display element 602, and enabling the device to capture video in accordance with various embodiments. In order to provide various functionality described herein, FIG. 7 illustrates an example set of basic components of a computing device 700, such as the device 600 described with respect to FIG. 6. In this example, the device includes at least one central processor 702 for executing instructions that can be stored in at least one memory device or element 704. As would be apparent to one of ordinary skill in the art, the device can include many types of memory, data storage or computer-readable storage media, such as a first data storage for program instructions for execution by the processor 702, the same or separate storage can be used for images or data, a removable storage memory can be available for sharing information with other devices, etc.

The device typically will include some type of display element 706, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology. As discussed above, the device in many embodiments will include one or more image capture elements 708, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element can include, or be based at least in part upon any appropriate technology, such as a CCD or CMOS image capture element having a sufficient resolution, focal range, viewable area, to capture an image of the user when the user is operating the device.

The device, in many embodiments, will include at least one audio element 710, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one or more motion and/or orientation elements 712 that provide information such as a position, direction, motion, or orientation of the device. These one or more motion and/or orientation determining elements 712 can include, for example, accelerometers, inertial sensors, electronic gyroscopes, electronic compasses, and GPS elements.

The example device can also include one or more additional input devices 718 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

The example device also includes one or more wireless components 714 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 716 known in the art for providing power to a portable computing device, which can include capacitive charging elements for use with a power pad or similar device as discussed elsewhere herein. The example device also can include at least one touch and/or pressure sensitive element 718, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 8:
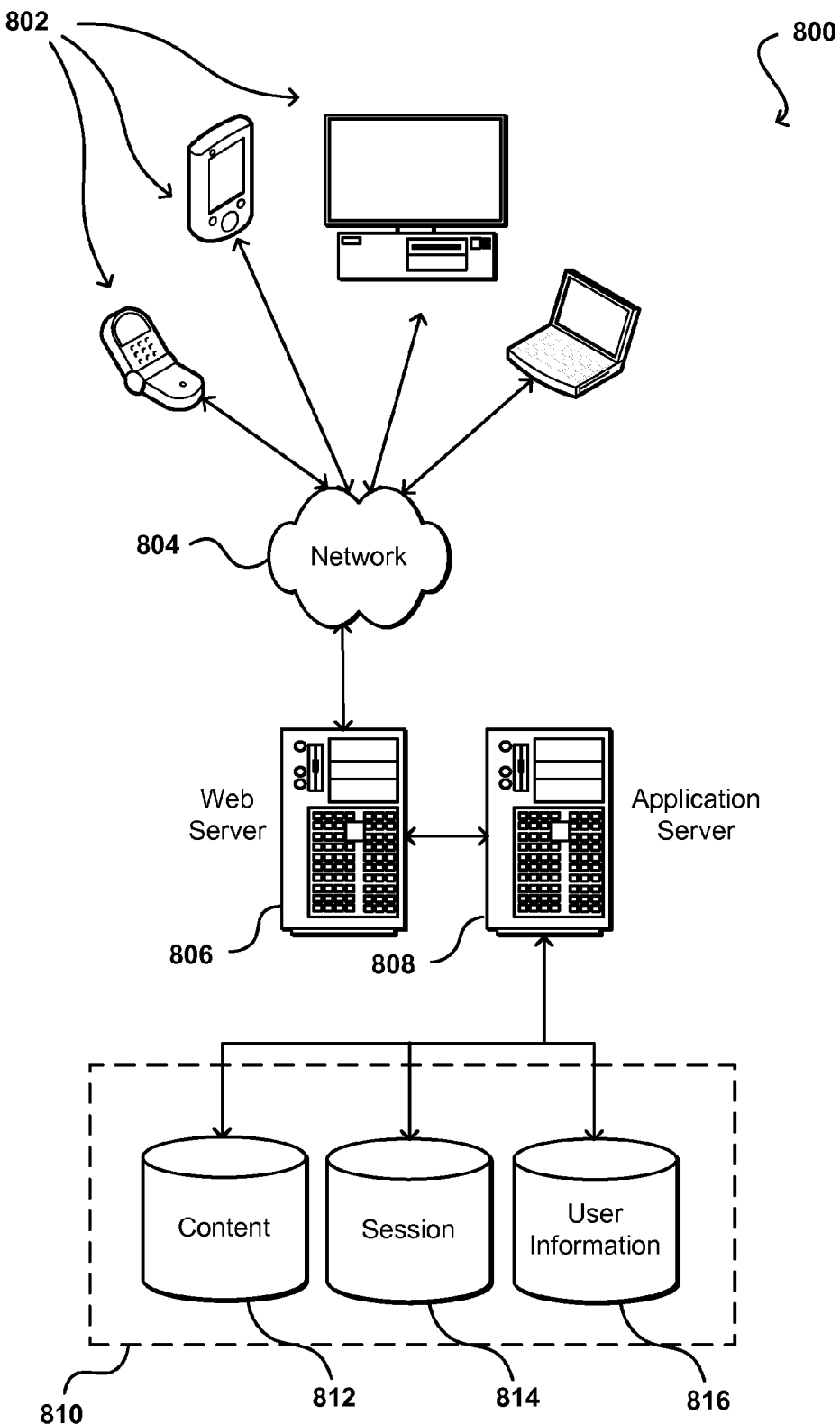
FIG. 8 illustrates an example environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of updating an enhanced video via a computing device, comprising:
    under control of one or more computer systems configured with executable instructions,
        defining a mapping between first pixel addresses of an enhanced video and second pixel addresses of each of one or more front-facing image capturing components of a computing device and one or more rear-facing image capturing components of the computing device;
        receiving a plurality of video frames each captured respectively using the one or more front-facing image capturing components and the one or more rear-facing image capturing components;
        determining pose data of each of the one or more front-facing image capturing components and the one or more rear-facing video capturing components with respect to each of the plurality of video frames using one or more motion determination components of the computing device capable of determining motion along six axes;
        registering each of the plurality of video frames with respect to a current video frame of the enhanced video based at least in part upon the mapping and the pose data;
        generating a new video frame of the enhanced video using at least some of the pixels of at least one registered video frame; and
        updating the enhanced video with the new video frame, wherein the enhanced video comprises a first display resolution that is greater than a second display resolution that each of the one or more front-facing image capturing components and the one or more rear-facing image capturing components is capable of capturing in video.

2. The computer-implemented method of claim 1, wherein the at least some of the pixels have been blended to compensate for at least one of sampling differences or exposure differences.

3. The computer-implemented method of claim 1, wherein at least one of the one or more front-facing video capturing components or the one or more rear-facing video capturing components includes a wide-angle lens.

4. A computer-implemented method of creating a video via a computing device, comprising:
   determining a mapping between first dimensions of each of a plurality of image capturing components of a computing device and second dimensions of an output video;
   obtaining image data including a plurality of images each captured respectively using the plurality of image capturing components;
   determining pose data for each of the plurality of image capturing components with respect to each of the plurality of images using at least one motion determination component of the computing device capable of determining motion along six axes;
   registering the image data to generate registered image data based at least in part upon the mapping and the pose data; and
   generating the output video by compositing at least some of the registered image data.

5. The computer-implemented method of claim 4, wherein registering the image data includes determining feature-based matches between the plurality of images of the image data.

6. The computer-implemented method of claim 4, wherein registering the image data includes determining pixel-to-pixel matches between the plurality of images of the image data.

7. The computer-implemented method of claim 4, wherein at least one frame of the output video conforms to a projection model.

8. The computer-implemented method of claim 7, wherein the projection model is at least one of a planar projection, a cut planar projection, a piecewise planar projection, a cylindrical projection, a spherical projection, or a variant thereof.

9. The computer-implemented method of claim 4, further comprising:
   blending at least some pixels of the output video to compensate for at least one of sampling differences or exposure differences.

10. The computer-implemented method of claim 4, wherein the output video comprises a first display resolution that is greater than a second display resolution that each of the plurality of image capturing components is capable of capturing in video.

11. The computer-implemented method of claim 4, wherein at least one of the plurality of image capturing components includes a wide-angle lens.

12. The computer-implemented method of claim 4, further comprising:
   causing the output video to be streamed to a second computing device.

13. The computer-implemented method of claim 12, further comprising:
   causing a perspective of a displayed view of the output video streamed to the second computing device to be changed in response to a request by a user of the second computing device.

14. The computer-implemented method of claim 12, further comprising:
   causing a displayed view of the output video streamed to the second computing device to auto-focus on a specified object in the output video streamed to the second computing device in response to a request by a user of the second computing device.

15. The computer-implemented method of claim 12, further comprising:
   causing a displayed view of the output video streamed to the second computing device to correspond to at least one of panning, zooming, or tilting to another location in response to a request by a user of the second computing device.

16. The computer-implemented method of claim 12, wherein the plurality of image capturing components includes at least one rear-facing image capturing component, and the method further comprises:
   tracking a specified portion of a user of the computing device using the the at least one rear-facing image capturing component.

17. The computer-implemented method of claim 4, wherein rotation of at least one of the plurality of image capturing components is controlled by the computing device.

18. The computer-implemented method of claim 4, wherein determining the pose data further includes applying at least one of a Kalman filter or a complementary filter to fuse the data from a plurality of motion determination components of the computing device.

19. The computer-implemented method of claim 4, wherein at least one portion of the output video is not captured in real time, the method further comprising:
   providing an indication that the at least one portion needs to be captured.

20. A computing device for creating a video comprising:
   at least one processor;
   a plurality of image capturing components;
   at least one motion determination component capable of determining motion along six axes;
   a memory device including instructions that, upon being executed by the at least one processor, cause the computing device to:
      determine a mapping between first dimensions of each of a plurality of image capturing components of the computing device and second dimensions of an output video;
      obtain image data including a plurality of images each captured respectively using the plurality of image capturing components;
      determine pose data for each of the plurality of image capturing components with respect to each of the plurality of images using the at least one motion determination component;
      register the image data to generate registered image data based at least in part upon the mapping and the pose data; and
      generate the output video by compositing at least some of the registered image data.

21. The computing device of claim 20, wherein the instructions upon being executed by the at least one processor further cause the computing device to:

blend at least some pixels of the output video to compensate for at least one of sampling differences or exposure differences.

22. The computing device of claim 20, wherein the instructions upon being executed by the at least one processor further cause the computing device to:
cause the output video to be streamed to a second computing device; and
cause a displayed view of the output video streamed to the second computing device to change a perspective or auto-focus on a specified object in response to a request to a user of the second computing device.

23. The computing device of claim 20, wherein at least one of the plurality of image capturing components comprises a rear-facing image capturing component, and the instructions upon being executed further cause the computing device to:
track a specified portion of a user of the computing device using the the rear-facing image capturing component.

24. A non-transitory computer-readable storage medium storing instructions for creating a video, the instructions upon being executed by a processor causing the processor to:
determine a mapping between first dimensions of each of a plurality of image capturing components of a computing device and second dimensions of an output video;
obtain image data including a plurality of images each captured respectively using the plurality of image capturing components of a computing device;
determine pose data for each of the plurality of image capturing components with respect to each of the plurality of images using at least one motion determination component of the computing device capable of determining motion along six axes;
register the image data to generate registered image data based at least in part upon the mapping and the pose data; and
generate the output video by compositing at least some of the registered image data.

25. The non-transitory computer-readable storage medium of claim 24, wherein the instructions upon being executed further cause the processor to:
control the rotation of at least one of the plurality of image capturing components.

26. The non-transitory computer-readable storage medium of claim 24, wherein the output video comprises a first display resolution that is greater than a second display resolution that each of the plurality of image capturing components is capable of capturing in video.

* * * * *